US011803896B2

(12) United States Patent
Periyathambi et al.

(10) Patent No.: US 11,803,896 B2
(45) Date of Patent: Oct. 31, 2023

(54) METHOD, SYSTEM, AND MEDIUM FOR NETWORK AND SPEED ENHANCEMENT FOR DISTRIBUTING UNIFIED IMAGES VIA A COMPUTER NETWORK

(71) Applicant: eBay Inc., San Jose, CA (US)

(72) Inventors: Ramesh Periyathambi, San Ramon, CA (US); Tomer Lancewicki, Jersey City, NJ (US); Kishore Kumar Mohan, Fremont, CA (US); Lakshimi Duraivenkatesh, San Ramon, CA (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 101 days.

(21) Appl. No.: 16/821,583

(22) Filed: Mar. 17, 2020

(65) Prior Publication Data

US 2021/0295422 A1     Sep. 23, 2021

(51) Int. Cl.
*G06Q 30/0601*     (2023.01)
*G06N 20/00*        (2019.01)
(Continued)

(52) U.S. Cl.
CPC ..... *G06Q 30/0643* (2013.01); *G06F 16/9535* (2019.01); *G06F 18/2113* (2023.01);
(Continued)

(58) Field of Classification Search
CPC ........... G06Q 30/0643; G06Q 30/0629; G06Q 30/0601–0645; G06N 20/00; G06N 5/04; G06F 16/9535; G06F 3/0482; G06K 9/6215; G06K 9/623; G06K 9/6267; H04L 67/32
(Continued)

(56) References Cited

U.S. PATENT DOCUMENTS

| 7,856,380 B1 | 12/2010 | Latin et al. |
| 8,458,054 B1 * | 6/2013 | Thakur .............. G06Q 30/0643 705/27.1 |
| 9,519,918 B2 | 12/2016 | Goswami et al. |
| 9,723,056 B1 * | 8/2017 | Kuo ....................... H04L 67/565 |

(Continued)

OTHER PUBLICATIONS

Rand Fishkin, How to Rank in Google Image Search, May 12, 2017 (Year: 2017).*

(Continued)

*Primary Examiner* — Marissa Thein
*Assistant Examiner* — Anna Mae Mitros
(74) *Attorney, Agent, or Firm* — SHOOK, HARDY & BACON L.L.P.

(57) ABSTRACT

Methods for determining which image of a set of images to present in a search results page for a product are described. Components of a server system may receive a set of images for a set of items associated with a product. Components of the server system may perform image ranking to rank the set of images to identify a representative image of the set of images for the product, based on a user interaction metric of each image of the set of images. The components of the server system may then receive, from a user device, a search query that may be mapped to the product, and the component of the server system may transmit, to the user device, the search results page that includes at least one item of the set of items and the representative image based on the interaction metric of the representative image.

17 Claims, 11 Drawing Sheets

(51) Int. Cl.

| | | |
|---|---|---|
| *G06N 5/04* | (2023.01) | |
| *G06F 16/9535* | (2019.01) | |
| *H04L 67/60* | (2022.01) | |
| *G06F 18/22* | (2023.01) | |
| *G06F 18/24* | (2023.01) | |
| *G06F 18/2113* | (2023.01) | |
| *G06V 10/75* | (2022.01) | |
| *G06V 10/764* | (2022.01) | |
| *G06F 3/0482* | (2013.01) | |

(52) U.S. Cl.
CPC .............. *G06F 18/22* (2023.01); *G06F 18/24* (2023.01); *G06N 5/04* (2013.01); *G06N 20/00* (2019.01); *G06Q 30/0629* (2013.01); *G06V 10/75* (2022.01); *G06V 10/764* (2022.01); *H04L 67/60* (2022.05); *G06F 3/0482* (2013.01)

(58) Field of Classification Search
USPC ...................................... 705/26.64, 26.1–27.2
See application file for complete search history.

(56) References Cited

U.S. PATENT DOCUMENTS

| | | | | |
|---|---|---|---|---|
| 2012/0128239 | A1* | 5/2012 | Goswami | G06Q 30/0243 382/162 |
| 2014/0108206 | A1* | 4/2014 | Chechuy | G06Q 30/0603 705/27.1 |
| 2014/0180758 | A1* | 6/2014 | Agarwal | G06Q 30/06 705/7.29 |
| 2014/0344727 | A1* | 11/2014 | Chaudhry | H04L 43/0876 715/760 |
| 2015/0169631 | A1* | 6/2015 | Gu | G06F 16/50 707/723 |
| 2016/0196359 | A1* | 7/2016 | Djabarov | G06F 16/9535 707/722 |
| 2018/0108066 | A1* | 4/2018 | Kale | G06F 16/583 |
| 2019/0080207 | A1* | 3/2019 | Chang | G06K 9/723 |

OTHER PUBLICATIONS

Hu et al., "Multiple-Instance Ranking: Learning to Rank Images for Image Retrieval", Retrived from the Internet URL: <http://projectsweb.cs.washington.edu/research/VACE/VisionResearchGroup/cvpr08/012.pdf>, @2008 IEEE, 2008, 8 pages.

* cited by examiner

Search Result 305

Listing 315-a

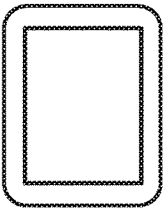
Image 310-a

Item: Computer Tablet Model 2, 64 GB, Gray Housing
Current Bid: $112.33

[Purchase Now!] [Click Here to see other images]

Listing 315-b

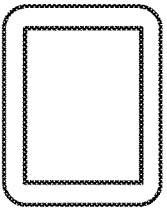
Image 310-b

Item: Computer Tablet Model 2, 64 GB, Gold Housing
Current Bid: $102.41

[Purchase Now!] [Click Here to see other images]

Listing 315-c

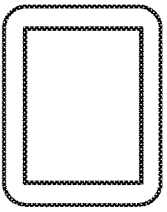
Image 310-c

Item: Computer Tablet Model 2, 64 GB, Black Housing
Current Bid: $121.67

[Purchase Now!] [Click Here to see other images]

Listing 315-d

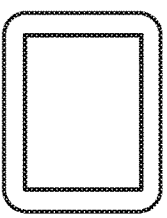
Image 310-d

Item: Computer Tablet Model 2, 64 GB, Gold Housing
Current Bid: $106.43

[Purchase Now!] [Click Here to see other images]

Search Result 405

Image 410

Listing 415-a

Item: Computer Tablet Model 2, 64 GB, Gray Housing
Current Bid: $112.33

[Purchase Now!] [Click Here to see other images]

Listing 415-b

Item: Computer Tablet Model 2, 64 GB, Gold Housing
Current Bid: $112.33

[Purchase Now!] [Click Here to see other images]

Listing 415-c

Item: Computer Tablet Model 2, 64 GB, Black Housing
Current Bid: $112.33

[Purchase Now!] [Click Here to see other images]

Listing 415-d

Item: Computer Tablet Model 2, 64 GB, Gold Housing
Current Bid: $112.33

[Purchase Now!] [Click Here to see other images]

METHOD, SYSTEM, AND MEDIUM FOR NETWORK AND SPEED ENHANCEMENT FOR DISTRIBUTING UNIFIED IMAGES VIA A COMPUTER NETWORK

FIELD OF TECHNOLOGY

The present disclosure relates generally to server systems and data processing, and more specifically to network and speed enhancement for distributing unified images via a computer network.

BACKGROUND

Computer networks permit the transport of data between interconnected computers. Search engine technology permits a user to obtain information from a vast array of sources available via a computer network. A search engine may be program that searches for and identifies content in a database that correspond to keywords or characters input by the user, and may return websites available via the Internet based on the search. To generate a search, a user may interact with a user device, such as a computer or mobile phone, to submit a search query via a search engine. The search engine may execute the search and display results for the search query based on communication with other applications and servers. In some cases, network bandwidth may be limited and the ability of the network to return search results may be impacted by the amount of traffic currently being communicated via the network. Techniques for efficiently utilizing resources of a computer network are desired.

SUMMARY

A method of determining which image of a set of images to present in a search results page for a product is described. The method may include receiving the set of images for a set of items that are associated with the product, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

An apparatus for determining which image of a set of images to present in a search results page for a product is described. The apparatus may include a processor, memory coupled with the processor, and instructions stored in the memory. The instructions may be executable by the processor to cause the apparatus to receive the set of images for a set of items that are associated with the product, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

Another apparatus for determining which image of a set of images to present in a search results page for a product is described. The apparatus may include means for receiving the set of images for a set of items that are associated with the product, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

A non-transitory computer-readable medium storing code for determining which image of a set of images to present in a search results page for a product is described. The code may include instructions executable by a processor to receive the set of images for a set of items that are associated with the product, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

In some examples of the method, apparatuses, and non-transitory computer-readable medium described herein, transmitting the search results page may include operations, features, means, or instructions for transmitting, to the user device, the search results page that includes the first image based on a network bandwidth measurement satisfying a bandwidth threshold.

Some examples of the method, apparatuses, and non-transitory computer-readable medium described herein may further include operations, features, means, or instructions for monitoring, via one or more search results pages, user interaction with the set of images to generate a user interaction metric for each image of the set of images, where ranking the set of images may be based on applying a machine learning model to the user interaction metrics.

In some examples of the method, apparatuses, and non-transitory computer-readable medium described herein, monitoring user interaction with the set of images may include operations, features, means, or instructions for monitoring, via one or more search results pages, a user view time for one or more images of the set of images, a user image zoom indicator for one or more images of the set of images, an item sales price for each item in at least a subset of the set of items that sell, or any combination thereof, to generate the user interaction metrics.

Some examples of the method, apparatuses, and non-transitory computer-readable medium described herein may further include operations, features, means, or instructions for monitoring, via one or more search results pages, user interaction with the first image to generate an updated user interaction metric for the first image, ranking, based on the updated user interaction metric, the set of images to identify a second image of the set of images for the product, receiving, from the user device or a second user device, a second search query that may be mapped to the product, and transmitting, to the user device or the second user device, a second search results page that includes the second image that may be the same as the first image or differs from the first image.

Some examples of the method, apparatuses, and non-transitory computer-readable medium described herein may further include operations, features, means, or instructions for receiving a listing for the at least one item of the set of items and one or more images of the set of images that may be associated with the listing, where the first image differs from each of the one or more images that may be associated with the listing.

Some examples of the method, apparatuses, and non-transitory computer-readable medium described herein may further include operations, features, means, or instructions for receiving a listing for the at least one item of the set of items that does not may have any images of the set of images associated with the listing.

In some examples of the method, apparatuses, and non-transitory computer-readable medium described herein, transmitting the search results page may include operations, features, means, or instructions for transmitting, to the user device, the search results page that includes the first image for a listing associated with a first item and the first image for a listing associated with a second item of the set of items.

Some examples of the method, apparatuses, and non-transitory computer-readable medium described herein may further include operations, features, means, or instructions for performing image classification on the set of images based on extracting one or more image characteristics from the set of images, generating, based on the image characteristics, a confidence matching score for each item of the set of items, and mapping the set of items to the product based on the confidence matching scores.

A method of determining which image of a set of images to present in a search results page for a product is described. The method may include a memory device for storing instructions, a processor which, when executing the instructions, causes the system to perform operations including, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

An apparatus for determining which image of a set of images to present in a search results page for a product is described. The apparatus may include a processor, memory coupled with the processor, and instructions stored in the memory. The instructions may be executable by the processor to cause the apparatus to a memory device for storing instructions, a processor which, when executing the instructions, causes the system to perform operations including, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

Another apparatus for determining which image of a set of images to present in a search results page for a product is described. The apparatus may include means for a memory device for storing instructions, a processor which, when executing the instructions, causes the system to perform operations including, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

A non-transitory computer-readable medium storing code for determining which image of a set of images to present in a search results page for a product is described. The code may include instructions executable by a processor to a memory device for storing instructions, a processor which, when executing the instructions, causes the system to perform operations including, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

In some examples of the method, apparatuses, and non-transitory computer-readable medium described herein, transmitting the search results page may include operations, features, means, or instructions for transmitting, to the user device, the search results page that includes the first image based on a network bandwidth measurement satisfying a bandwidth threshold.

Some examples of the method, apparatuses, and non-transitory computer-readable medium described herein may further include operations, features, means, or instructions for monitoring, via one or more search results pages, user interaction with the set of images to generate a user interaction metric for each image of the set of images, where ranking the set of images may be based on applying a machine learning model to the user interaction metrics.

In some examples of the method, apparatuses, and non-transitory computer-readable medium described herein, monitoring user interaction with the set of images may include operations, features, means, or instructions for monitoring, via one or more search results pages, a user view time for one or more images of the set of images, a user image zoom indicator for one or more images of the set of images, an item sales price for each item in at least a subset of the set of items that sell, or any combination thereof, to generate the user interaction metrics.

Some examples of the method, apparatuses, and non-transitory computer-readable medium described herein may further include operations, features, means, or instructions for monitoring, via one or more search results pages, user interaction with the first image to generate an updated user interaction metric for the first image, ranking, based on the updated user interaction metric, the set of images to identify a second image of the set of images for the product, receiving, from the user device or a second user device, a second search query that may be mapped to the product, and transmitting, to the user device or the second user device, a second search results page that includes the second image that may be the same as the first image or differs from the first image.

Some examples of the method, apparatuses, and non-transitory computer-readable medium described herein may further include operations, features, means, or instructions for receiving a listing for the at least one item of the set of items that does not may have any images of the set of images associated with the listing.

In some examples of the method, apparatuses, and non-transitory computer-readable medium described herein, transmitting the search results page may include operations, features, means, or instructions for transmitting, to the user device, the search results page that includes the first image for a listing associated with a first item and the first image for a listing associated with a second item of the set of items.

Some examples of the method, apparatuses, and non-transitory computer-readable medium described herein may further include operations, features, means, or instructions for receiving a listing for the at least one item of the set of items and one or more images of the set of images that may be associated with the listing, where the first image differs from each of the one or more images that may be associated with the listing.

Some examples of the method, apparatuses, and non-transitory computer-readable medium described herein may further include operations, features, means, or instructions for performing image classification on the set of images based on extracting one or more image characteristics from the set of images, generating, based on the image characteristics, a confidence matching score for each item of the set of items, and mapping the set of items to the product based on the confidence matching scores.

A method of determining which image of a set of images to present in a search results page for a product is described. The method may include receiving the set of images for a set of items that are associated with the product, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

An apparatus for determining which image of a set of images to present in a search results page for a product is described. The apparatus may include a processor, memory coupled with the processor, and instructions stored in the memory. The instructions may be executable by the processor to cause the apparatus to receive the set of images for a set of items that are associated with the product, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

Another apparatus for determining which image of a set of images to present in a search results page for a product is described. The apparatus may include means for receiving the set of images for a set of items that are associated with the product, performing image ranking to rank the set of images to identify a first image of the set of images for the product, based on a user interaction metric of each image of the set of images, receiving, from a user device, a search query that is mapped to the product, and transmitting, to the user device, the search results page that includes at least one item of the set of items and the first image based on the user interaction metric of the first image.

A non-transitory computer-readable medium storing code for determining which image of a set of images to present in a search results page for a product is described. The code may include instructions executable by a processor to receive the set of images for a set of items that are associated with the product, perform image ranking to rank the set of images to identify a first image of the set of images for the product, based on a user interaction metric of each image of the set of images, receive, from a user device, a search query that is mapped to the product, and transmit, to the user device, the search results page that includes at least one item of the set of items and the first image based on the user interaction metric of the first image.

In some examples of the method, apparatuses, and non-transitory computer-readable medium described herein, transmitting the search results page may include operations, features, means, or instructions for transmitting, to the user device, the search results page that includes the first image based on a network bandwidth measurement satisfying a bandwidth threshold.

BRIEF DESCRIPTION OF THE DRAWINGS

FIG. 3 illustrates an example of a webpage that supports network and speed enhancement for distributing unified images via a computer network in accordance with aspects of the present disclosure.

FIG. 4 illustrates an example of a webpage that supports network and speed enhancement for distributing unified images via a computer network in accordance with aspects of the present disclosure.

DETAILED DESCRIPTION

Figure 1:
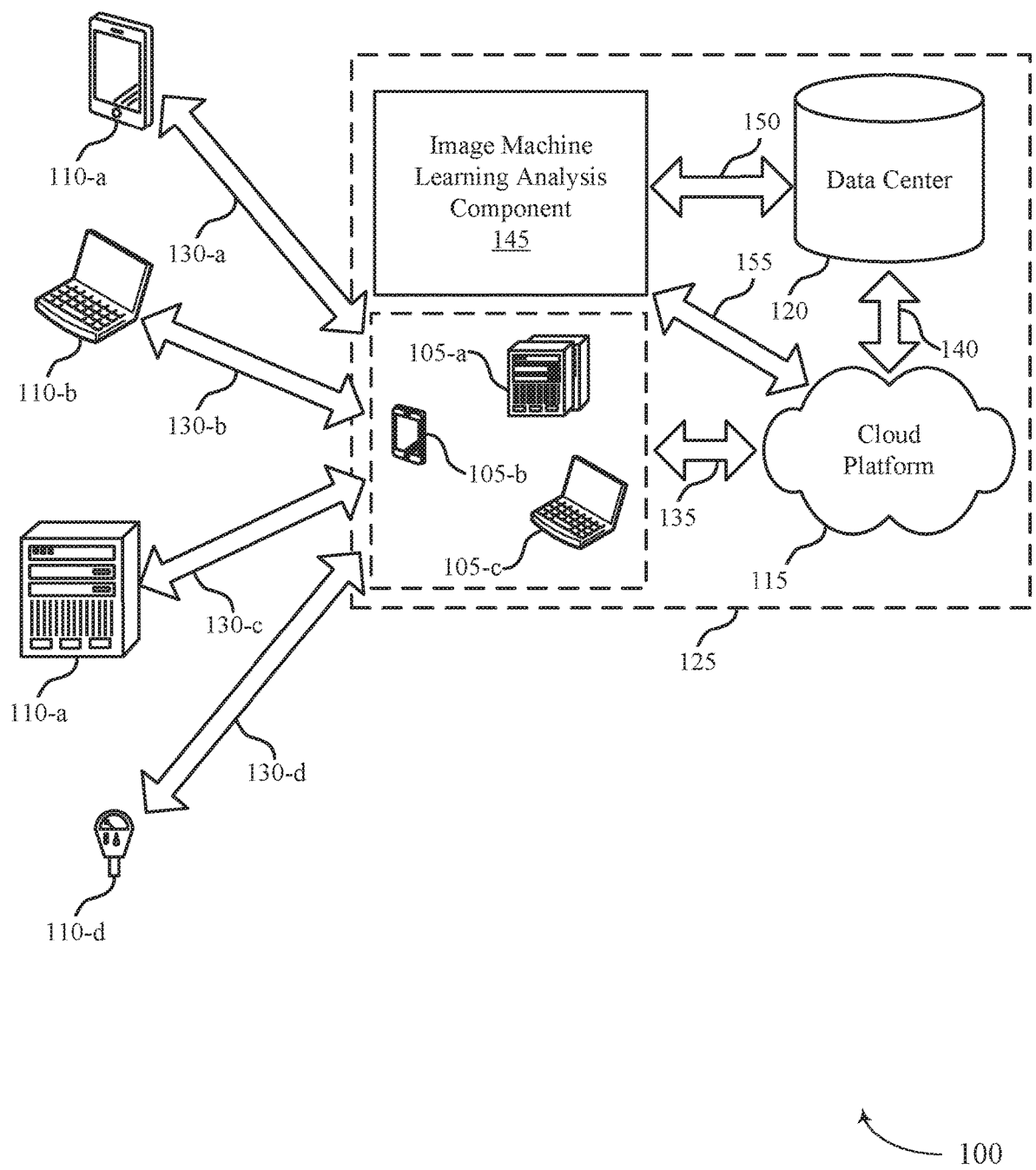
FIG. 1 illustrates an example of a server system that supports network and speed enhancement for distributing unified images via a computer network in accordance with aspects of the present disclosure.

Computer network bandwidth is a finite resource and may refer to a rate at which data is communicated between various computing devices. The Internet, for instance, may be a network that transports data for software applications ("Apps") and websites between a set of computers. At certain times, the amount of data being transported via a computer network may utilize a high level of the available network bandwidth. Rather than immediately transmitting data from one device to the next, data may be buffered at a device due to the network congestion, which may slow down the ability of the network to transport requested data to a requesting device in a timely manner. This delay may be referred to as latency, and may degrade the experience of an end user.

The techniques described herein may provide for network and speed enhancement for distributing unified images via a computer network. In an example, a server system may host an online application, such as website or an app, that may be accessible by end user client computing devices via a computer network. In an example, the online application may be a customer facing website for an online marketplace (e.g., an online retail platform) where a user may purchase goods and/or services via the online application. In some cases, the online marketplace may permit a seller (e.g., a business or user) to set a price for an item being sold. An item may refer to a product having a particular set of characteristics. In some examples, the online marketplace may implement an online auction where sellers may submit bids at a desired price for an item.

The online application may provide a graphical user interface that may be presented at a user device in which a seller may generate a listing of one or more items (e.g., products, services, etc.) that the seller would like to sell. As part of generating the listing, the online application may, in some examples, prompt the seller to upload images (e.g., photos) of the item for sale, input a description of the item, a title for the listing, a universal product code (UPC) for the item, provide a sale price or a starting bid price for an online auction, include a purchase it now price for the item, or any combination thereof. A seller may utilize the online application to list for sale multiple items of the same type, or a variety of items of different types of items (e.g., different types of products). Multiple sellers may also upload listings for the same item, or for similar items with slight differences (e.g., size, color, generation, etc.).

A buyer may utilize their user device (e.g., a buyer device) to access the online application and to browse different listings of items available for sale from one or more sellers. The buyer may input, via a user device presenting a graphical user interface provided by the online application, a search query describing an item (e.g., product) that the user may wish to buy. The server system may process the query to identify at least one product that corresponds to the query, and one or more seller listings for that product. The server system may transmit, to the buyer device, a search results page that includes one or more listings for the item for presentation to the buyer.

Networks traffic conditions presents challenges when providing search results to a buyer user device via a computer network. In some cases, the amount of data included in each search results page may vary based on the number of listings in the search results page, and the amount of data included in each listing. Specifically, the amount of data included in each listing may vary from listing to listing. The amount of data included in each search results page may also vary based on the amount of data in each listing and the number of included listings. In particular, conventional systems may include one or more images provided by a seller when generating a listing, and the data size of the images included in each listing may vary. Moreover, sellers may upload very different images when generating a listing for a same or similar item. Transmitting a listing, or a search result that includes multiple listings, may consume network bandwidth, and may impact network bandwidth utilization. Additionally, search results pages may include a large amount of data due to the images of the listing having different sizes, having different depictions of a same or similar item, and transport of the search results page may impact network utilization. Moreover, some images included by a seller in a listing may, unintentionally, negatively impact the seller's goal of selling an item at a desired price (e.g., a highest possible price).

The techniques described herein may provide for network and speed enhancement for distributing unified images via a computer network. The server system may employ machine learning techniques to efficiently utilize network bandwidth by selecting a representative image (e.g., a unified image) to display in listings for an item (e.g., product) available for sale. When a listing is created, the server system may classify an item listed for sale as a listing for a particular product and may receive uploaded images for the item being listed for sale. In some cases, multiple listings may be mapped to a particular product. In some examples, items mapped to a product may be identical versions of the product, or the items may vary in at least some way (e.g., color), but are still mapped to the same product.

The server system may use machine learning to monitor buyer behavior to determine which images for a product result in a desired outcome, and may select a representative image (e.g., a unified image) for the product based on the monitoring. The desired outcome may be, for example, an increased likelihood of a buyer making a purchase, an increase in gross merchandise bought (GMB), or the like. For example, the machine learning may determine a unified image for the product based on a user interaction metric generated for each seller uploaded image associated with listings for the product. In an example, the machine learning model may generate the user interaction metric based on an amount of time a prospective buyer spent viewing an image, whether the prospective buyer actually purchased the item listed for sale, whether the prospective buyer zoomed in or otherwise manipulated an image, how many of the images posted for the listing the prospective buyer selected to view, a purchase price that the buyer paid for the listed item, or the like, or any combination thereof. The user interaction metric may be a numerical value assigned to each seller uploaded image of each listing for the product.

The machine learning model may generate the user interaction metric for a seller uploaded image based on a determination of how well the image was able to achieve a desired outcome (e.g., sell an item quickly for a higher price as compared to images for other listings for the product). When generating the user interaction metric, the machine learning model may normalize the user interaction metric to account for any differences between listings (e.g., different color). The machine learning model may rank the seller uploaded images available for a product based on the user interaction metrics (e.g., place in numerical order), and select the unified image for the product (e.g., select the image having the user interaction metric with the highest numerical score as the representative image). The machine learning model may also use a feedback loop in order to iteratively update the selected unified image over time. For example, when network utilization conditions are favorable, the server system may include, in the search results pages, one or more images from the listings other than a previously identified unified image, to generate a user interaction metric for each image, and may use the generated user interaction metrics to determine whether to maintain or change the unified image.

The server system may also monitor network utilization and may intelligently select when to provide the unified image when serving search results. When network utilization is low, the server system may serve a search results page that includes the images uploaded by the seller with or without the unified image (e.g., for updating a user interaction metric for the images). When network utilization is higher (e.g., satisfies a congestion threshold), the server system may serve a search results page that includes the unified image instead of one or more the images uploaded by the seller.

Providing a unified image may improve speed, bandwidth utilization, enhance the likelihood of a desired outcome for a listing, and improve the user experience of a buyer. A unified image may also be provided for a listing in cases where the seller did not upload an image when generating a listing. Further, the server system may provide, in some examples, a single unified image to a buyer device for a search results page that includes multiple listings. Providing a single unified image may be beneficial in cases where a low bandwidth connection is detected for a user or when a network is bandwidth constrained, as only one image may be downloaded by the user device rather than many. The unified image identification may also improve speed of providing search results to a buyer device.

Aspects of the disclosure are initially described in the context of a server systems and data processing. Aspects of the disclosure are then described in the context of an application flow, a webpages, and a process flow. Aspects of the disclosure are further illustrated by and described with reference to apparatus diagrams, system diagrams, and flowcharts that relate to network and speed enhancement for distributing unified images via a computer network.

FIG. 1 illustrates an example of a system 100 that supports network and speed enhancement for distributing unified images via a computer network in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or any other organization type.

A cloud client 105 may facilitate communication between the data center 120 and one or multiple user devices 110 to implement an online marketplace. The network connection 130 may include communications, opportunities, purchases, sales, or any other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to certain applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or any other appropriate form of electronic interaction (e.g., network connections 130-*a*, 130-*b*, 130-*c*, and 130-*d*) via a computer network. In an example, the user device 110 may be computing device such as a smartphone 110-*a*, a laptop 110-*b*, and also may be a server 110-*c* or a sensor 110-*d*. In other cases, the user device 110 may be another computing system. In some cases, the user device 110 may be operated by a user or group of users. The user or group of users may be a customer, associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, image machine learning analysis component 145, and data center 120 that may coordinate with cloud platform 115 and data center 120 to implement an online marketplace. In some cases, data processing may occur at any of the components of server system 125, or at a combination of these components. In some cases, servers may perform the data processing. The servers may be a cloud client 105 or located at data center 120.

The image machine learning analysis component 145 may communicate with cloud platform 115 via connection 155, and may also communicate with data center 120 via connection 150. The image machine learning analysis component 145 may receive signals and inputs from user device 110 via cloud clients 105 and via cloud platform 115 or data center 140.

Server system 125 may include operations similar to those as described herein. One or more components of server system 125, including image machine learning analysis component 145, as described herein, may operate to determine which image of a set of images to present in a search results page for a product. The image machine learning analysis component 145 within server system 125 may receive, via a seller user device 110 and cloud platform 115, the set of images for a set of items that may be associated with the product. The server system 125 and the image machine learning analysis component 145 may perform image ranking to rank the set of images to identify a first image of the set of images for the product, based on a user interaction metric of each image of the set of images. The server system 125 and the image machine learning analysis component 145 may receive, from a buyer user device 110, such as any of user devices 110, a search query that may be mapped to the product. The server system 125 and the image machine learning analysis component 145 may then transmit, to the user device (e.g., any of user devices 110), a search results page that includes at least one item of the set of items and a unified image.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
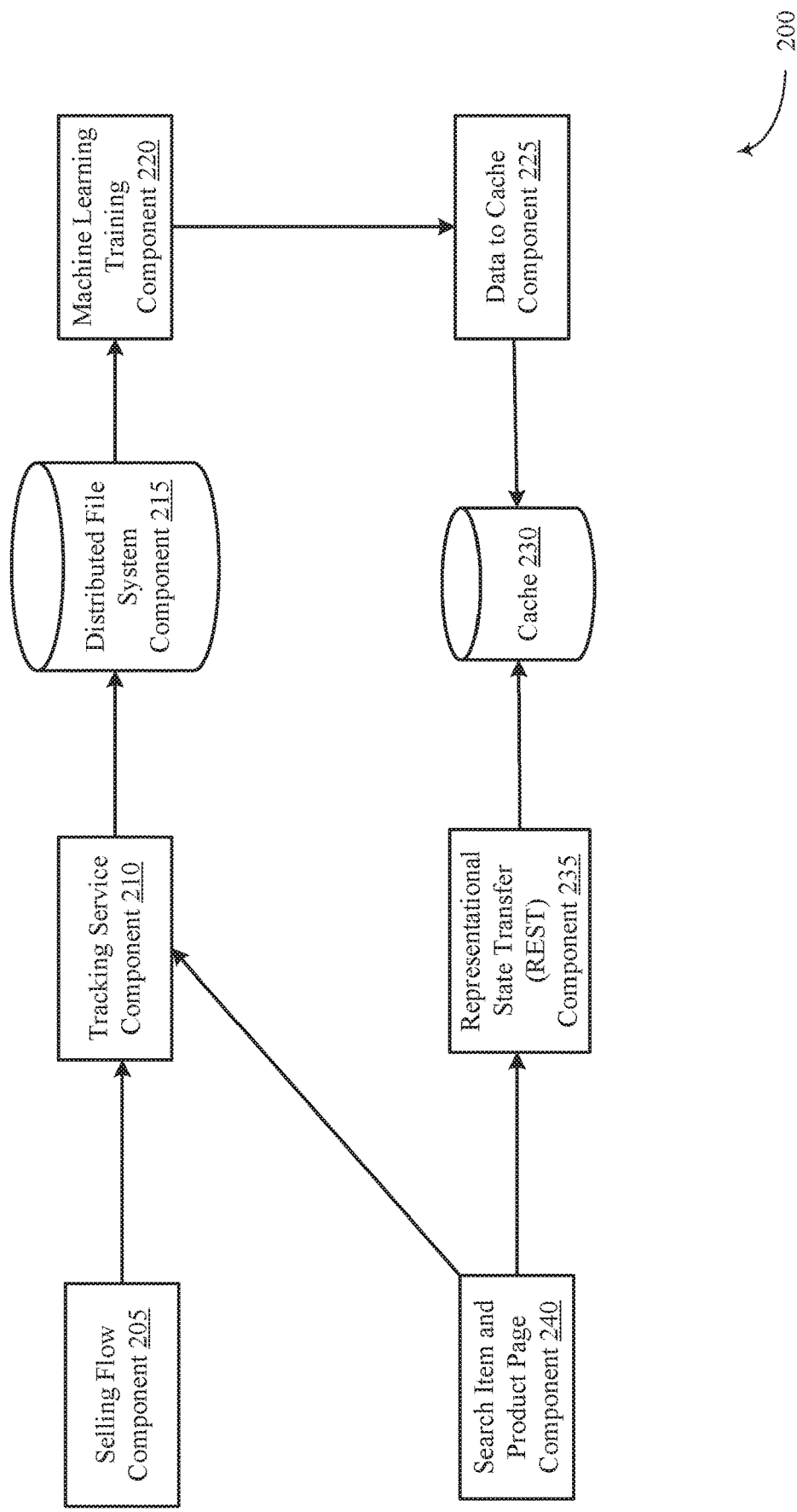
FIG. 2 illustrates an example of an application flow that supports network and speed enhancement for distributing unified images via a computer network in accordance with aspects of the present disclosure.

FIG. 2 illustrates an example of an application flow 200 that supports network and speed enhancement for distributing unified images via a computer network in accordance with aspects of the present disclosure. Components of the application flow 200 may include components of server system, such as server system 125 of the system 100, as described with reference to FIG. 1, or server system 125-b, as described with reference to FIG. 5, for implementing an online marketplace. Some components of application flow 200 may be within or communicating with a data center, such as data center 120, or a cloud platform, such as cloud platform 115, or both. Application flow 200 may represent a number of components used to select an unified image of a set of images for a product in order to efficiently utilize available bandwidth of a network.

Selling flow component 205 may interact with one or more users to generate listings from one or more users, or "sellers" that may intend to sell one or more items (e.g., products) via an online marketplace. The seller may be a user operating a user device, such as a user device 110 or a user device 505 as described with respect to FIGS. 1 and 5, respectively. The interaction with selling flow component 205 may prompt the seller to input a number of parameters describing the item to be listed for sale. In an example, the selling flow component 205 may cause the user device 110 to present a graphical user interface for generation of a listing. A seller may generate a listing of an item (e.g., product) for sale that includes a description of the product, and, in some cases, may upload to the selling flow component 205 one or more images of the item. The selling flow component 205 may suggest a product to the seller for the listing based on the description of the product provided by the sell. In some cases, the selling flow component 205 may cause the seller user device 110 to display a menu for selecting by the seller of a suggested product for the listing. In an example, a seller may interact with selling flow component 205 to generate a listing for a tablet computer, such as an Apple iPad. The specific Apple iPad listed by the seller may include further characteristics that are included in the listing. For example, the listing may include that the product for sale is an Apple iPad Air 64 GB with Wi-Fi capabilities.

The selling flow component 205 may categorize the listing as for a particular product of a set of products available to purchase via the online marketplace. A listing may be mapped to a particular product where the items listed for sale have the same or similar characteristics, but may permit some variation to exist between the items while still being mapped to the same product. In some cases, the seller generating the listing may select or recommend that the listing is for a particular product. The user-recommended product for the listing may be updated or changed by the selling flow component 205 or a machine learning training component 220.

In some examples, the selling flow component 205 may categorize a set of one or more items as being for a product by a product identification mapping process. The product identification mapping process may include an analysis of the initial product as suggested by the seller, include a confidence analysis of the accuracy of that selection based on the title, product details, computer vision analysis of the one or more seller uploaded images, or the like. The product identification mapping process may also extend to other similar clusters of products using an algorithm, such as a k-nearest neighbors (KNN) algorithm. This product identification process may be performed by the selling flow component 205 or the machine learning training component 220.

In some examples, the selling flow component 205 or the machine learning training component 220 may execute a computer vision machine learning algorithm to confirm that it is appropriate to categorize an item a particular product category. An example of the computer vision machine learning algorithm may be a convolutional neural network, such as a residual network (e.g., ResNet-50, a residual network with 50 layers). In an example, image classification may be performed on some or all images uploaded for an item (e.g., when a listing is created or updated) to verify that the item is associated with the product suggested by a user. The computer vision machine learning system may extract one or more image characteristics of an image, and determine a confidence matching score for each image. The confidence matching score may indicate how confident the computer vision machine learning algorithm is that the image is of a particular product (e.g., an eBay catalog product).

To generate the confidence matching score, the computer vision machine learning algorithm may extract one or more image characteristics from one or more of the uploaded images and compare to one or more representative image characteristics of a set of representative figures for a product. The one or more image characteristics may include, for example, a shape of a depicted item, a color of a depicted item, one or more edges of a depicted item, or the like. The computer vision machine learning algorithm may assign a confidence matching score based on a degree to which the extracted one or more image characteristics match the one or more representative image characteristics. In some examples, the confidence matching score may be a numerical value.

The computer vision machine learning algorithm may use the seller uploaded images to generate a confidence matching score relative to multiple products, and may rank the confidence match scores to identify the product having the best match (e.g., highest confidence matching score) for a particular listing. The confidence matching score may also be used to confirm that the product listing suggested by the seller is appropriate, or to change the associated product suggested by the seller for a listing to a different product that better matches the uploaded images. For example, if the computer vision machine learning algorithm determines a lower confidence matching score between the uploaded images and a first product, the computer vision machine learning algorithm may determine that the first product indicated by the seller is incorrect or change the product associated with the listing to a different product that has a higher confidence matching score.

Each listing uploaded by one or more sellers may be tracked by a tracking service component 210. The tracking service component 210 may forward the listing and corresponding seller uploaded images for storage in a distributed file system component 215. Tracking service component 210 may monitor buyer behavior when viewing one or more listings in a search results pages. Examples of search results pages including listings that may be monitored are also discussed with reference to FIGS. 3 and 4. Tracking service component 210 may monitor a listing presented in a search results page for purchases, as well as monitor user interaction with the product listing and communicate user interaction parameters to the distributed file system component 215. Distributed file system component 215 may be an example of a HADOOP application. Distributed file system component 215 may use a network of multiple computers to analyze large amounts of data. Distributed file system component 215 may monitor and analyze sales throughout the online application as well as analyze sales based on user interaction parameters as detected by tracking service component 210.

The machine learning training component 220 may use a machine learning model to rank images and select a unified image for a product. The unified image may be included in a search result returned to a prospective buyer, for example, in cases where bandwidth is limited and throughput may be improved by providing one unified image to represent each listing of a set of listings for a product, instead of one or more seller uploaded images for a listing.

The machine learning training component 220 may use a machine learning model that selects a unified image for a product based on monitoring buyer interaction with listings presented in a search results page to other buyers. The machine learning model may be a computer algorithm. The machine learning training component 220 may apply the machine learning model on one or more user interaction parameters generated for listings of a product to identify the unified image. In an example, a user interaction parameter may include a length of time that a buyer spends viewing a particular image before purchasing, or failing to purchase, the listed item. A user interaction parameter may include whether the buyer actually purchased the item listed for sale after viewing an image. A user interaction parameter may include which images of a listing are zoomed in on or manipulated (e.g., enlarged, rotated) by a buyer, before purchasing, or failing to purchase, the listed item. A user interaction parameter may include whether a buyer clicks through multiple images of a listing before purchasing, or failing to purchase, the listed item. A user interaction parameter may include which image of a listing a buyer clicks on first before purchasing, or failing to purchase, the listed item. A user interaction parameter may include whether the buyer selects thumb-nail size of an image presented in a search result page to view a full-size version of the thumb-nail size image before purchasing, or failing to purchase, the listed item. A user interaction parameter may include how many images of a listing the buyer selects to view before purchasing, or failing to purchase, the listed item. A user interaction parameter may include a purchase price that the buyer paid for the listed item. A user interaction parameter may include a first purchase price that a first buyer paid for a listed item for a product after viewing a first image relative to a second purchase price a second buyer paid for a listed item for the product after viewing a second image. One or more user interaction parameters may be generated for one or more of the seller uploaded images, as well as other images included in a listing. In some cases, an image included in a search results pages may be received from a marketing organization for a product, and one or more user interaction parameters may be generated for such an image.

Tracking service component 210 may observe, over time, buyer interaction with one or more images of one or more listings for a product presented to buyers at a graphical user interface at a buyer user device (e.g., user device 110) to generate one or more of these user interaction parameters. Tracking service component 210 may communicate these parameters to the machine learning training component 220. The machine learning training component 220 may use one or more of these user parameters or a combination of these to generate a user interaction metric for each image of a listing for the product.

The machine learning training component 220 may generate the user interaction metric for an image based on a determination of how well the image was able to achieve a desired outcome (e.g., sell an item quickly for a higher price as compared to images for other listing for a product). The user interaction metric may apply a weighting to some or all of the one or more user interaction parameters to determine a numerical score that may indicate how well an image is able to achieve the desired outcome. When generating the user interaction metric, the machine learning training component 220 may normalize the user interaction metric to account for any differences between items in the listings. The user interaction metric may be a numerical value assigned to each image of each listing for a product. The machine learning model may rank the images available for a product based on the user interaction metrics (e.g., place in numerical order), and select the unified image for the product (e.g., select the image having the user interaction metric with the highest numerical score as the representative image). In some cases, the user interaction metric may be generated for seller uploaded images as well as other images provided, for example, by an organization marketing the product. The unified image may be one of the seller uploaded images, or an image obtained from another source. When a subsequent search query for the product is received from the same buyer or another buyer, the unified image may be included in a listing for the product presented in a search results page instead of, or in addition to, for one or more seller uploaded images for the product.

In some examples, the machine learning training component 220 may use a feedback loop in order to iteratively update the selected unified image over time. For example, when network utilization conditions are favorable, search results pages may include one or more images from the listings other than a previously identified unified image, to enable the tracking service component 210 to update the one or more user interaction parameters. The machine learning training component 220 may use the one or more updated user interaction parameters to generate an updated user interaction metric for each image, and may use the updated user interaction metrics to determine whether to maintain or change the unified image. The unified image for each product may therefore be determined based on the user interaction metrics or the computer vision machine learning system, or both.

Once the unified image is identified for a product, the machine learning training component 220 may forward the unified image and an identification of its product to a data to cache component 225 using a workflow management platform (e.g., Apache Airflow). The data to cache component 225 may be an example of a cache layer, such as a memory cache (e.g., memcache) or a non-structed query language (non-SQL or NOSQL) database. A NOSQL database may be an example of a Couchbase database. The data to cache component 225 may provide the unified image and an identification of its product for storage in cache 230.

When a buyer user device (e.g., user device 110) uses an online application to transmit a search query for an item listed for sale in the online marketplace, a representational state transfer (REST) component 235 may implement a REST service to respond to the query. The REST component 235 may query the cache 230 using the search query to identify a particular product of a set of available products and one or more listings that match the search query. In some cases, the cache 230 may return identifiers of which seller uploaded images, and which listings, match the search query, and an identifier of a product and a corresponding unified image. In some cases, the cache 230 may indicate that the seller did not upload an image for a particular listing. The REST component 235 may use the identifiers to retrieve the seller uploaded images, if any, and the unified image from the distributed file system component 215.

The REST component 235 may also monitor or obtain information about current network conditions for a computer network between itself and the buyer user device. The network conditions may include a current network congestion level, a current cost to transmit a particular amount of data via the computer network, a network connection type (e.g., low bandwidth, high speed, etc.), or the like. The REST component 235 may use the information about the current network conditions to coordinate with a search item and product page component 240 in generating a search results page that includes the one or more listings.

In some examples, the REST component 235 may determine that network conditions indicated that the network is congested. When congested, the search item and product page component 240 may generate the search results page to include as few as only the unified image for each listing for the product, instead of any of the seller uploaded images. The search results page may, however, include a link where the buyer user device may separately download one or more of the seller uploaded images. In other examples, when the network is not congested, the search item and product page component 240 may generate the search results page to include the unified image for each returned listing, in addition to one or more seller uploaded images. The search item and product page component 240 may then provide the search results page to the buyer user device for presentation to a prospective buyer (e.g., via a graphical user interface).

As the prospective buyer interacts with the search results page, the tracking service component 210 may coordinate with the search item and product page component 240 to monitor the behavior of the prospective buyer to update the one or more user interaction parameters (e.g., user manipulation of an image, whether user purchased a listed item after viewing the image, etc.) stored in the distributed file system component 215.

For example, the machine learning training component 220 may implement a cluster-computing framework (e.g., a pyspark job) that may mine the data in the distributed file system component 215 to determine whether the unified image has resulted in a particular desired outcome (e.g., an increase in purchase likelihood or a higher efficiency in bandwidth use). Components of the application flow 200 may thus monitor buyer behavior over time to establish a feedback loop to train (e.g., continuously train) the machine learning model for selecting the unified image for a product. The tracking service component 210 may continue to collect user interaction metrics, and the machine learning training component 220 may iteratively update the unified image based on the updated user interaction metrics. The machine learning training component 220 may use the updated one or more user interaction parameters to update the user interaction metric one or more images, and may use the updated interaction metrics for determining to maintain or change the unified image for the product.

The display of the unified image for a product may therefore improve speed and network bandwidth usage, as one image may be retrieved and downloaded for display along with multiple listings for a product, rather than displaying multiple images for a product. In some examples, the display of multiple images may be an inefficient use of network speed or bandwidth when network speed or bandwidth, or both, are limited.

FIG. 3 illustrates an example of a search results webpage 300 that supports network and speed enhancement for distributing unified images via a computer network in accordance with aspects of the present disclosure. Webpage 300 may be an example of a page displaying search results based on a buyer-inputted search query. Webpage 300 may be displayed to a prospective buyer at a user device (e.g., user device 110) at a computer, smartphone, or another client-facing user device.

A buyer may access an online application (e.g., a website or a smart-phone app) of an online marketplace (e.g., presented by search item and product page component 240) and input a search query. In an example, the buyer may enter a search for purchasing a tablet computer. In an example, a buyer may input "Apple iPad Air 2 64 GB Wi-Fi" as a search query. The search query may result in the display at the buyer user device of a search result 305 that includes one or more listing 315.

Each listing may include an image 310 associated with the listing. Search result 305 may include one or more listings generated by sellers (e.g., users utilizing a user device 110 to interact with a selling flow component 205) that relate to the search query input by the buyer. An example listing 315 may include information about the item for sale (e.g., Computer Tablet Model 2, 64 GB, Gray Housing), a current bid for the item if the item is being sold by auction, a price for the item (e.g., if using a purchase now feature), an option to view other seller uploaded images of the item, or the like. In the depicted example, the search result 305 includes listings 315-a, 315-b, 315-c, and 315-d, and each listing is associated with a same product (e.g., a "Computer Tablet Model 2, 64 GB" product). In some cases, each item referenced in a listing 315 may be for a same product, but may have some features that may vary from other listings for the product. For example, the color of a housing for the tablet computers may be different for some of the items, but each tablet computer may be the same model number (e.g., Model 2) and have a same storage capacity (e.g., 64 GB).

A same seller or a set of sellers may have generated the listings 315-a, 315-b, 315-c, and 315-d. One or more sellers, when generating the listing 315-a, 315-b, 315-c, and 315-d, may have uploaded a different set of images for each listing 315, even though each listing is for a same or similar product (e.g., Apple iPad Air 2 64 GB product). For example, listing 315-a may be for a tablet computer that is an "Apple iPad Air 2 64 GB Wi-Fi, 9.7 in, Space Gray, Grade A". The seller may have uploaded images for listing 315-a that may be one or more high resolution stock photos of the tablet computer. Listing 315-b may be "Apple iPad Air 2 64 GB Wi-Fi+ Cellular (Unlocked) 9.7 in, Space Gray". The seller may have uploaded images for listing 315-b that may be one or more images taken by the seller themselves, along with accessories (e.g., a charger for the tablet computer). Listing 315-*c* may be for an "Apple iPad Air 2 64 GB Wi-Fi, 9.7 in, Space Gray". The seller may have uploaded images for listing 315-*c* that may be one or more low resolution or blurry stock photos of the item. Listing 315-*d* may be for an "Apple iPad Air 2 64 GB Wi-Fi, Pre-owned," and the seller may not have uploaded any images when generating listing 315-*d*.

In the depicted example, an image 310 is displayed along with each listing 315, and images 310-*a*, 310-*b*, 310-*c*, and 310-*d* are shown. The images 310-*a*, 310-*b*, 310-*c*, and 310-*d* may be, for example, a thumb-nail sized version of an image, and the buyer may select to display a larger version of the same image. The machine learning techniques described herein may be used to select a unified (e.g., representative) image for that product, and some or all of the listings 315 for that product may display the same unified image. For example, each of images 310-*a*, 310-*b*, 310-*c*, and 310-*d* may be the same unified image for the same product. In some cases, a seller may not have uploaded any image when generating a listing 315, and the search results page 305 may include the unified image for that listing. For example, listing 315-*d* may not have any seller uploaded images, and image 310-*d* corresponding to listing 315-*d* may be the unified image (rather than displaying an empty box). In some examples, the search results page 305 may display listings 315 from multiple products, and a first subset of listings (e.g., listing 315-*a*, 315-*b*) may each display a first unified image of a first product of the multiple products, and a second subset of listings (e.g., listing 315-*c*, 315-*d*) may display a second unified image of a second product of the multiple products, where the first and second unified images differ.

The tracking service component 210 of the server system 125 as described herein may monitor user interactions with each of the listing 315 and images 310 presented in search results page 305. In some instances, when network conditions are not congested, at least some of the images 310-*a*, 310-*b*, 310-*c*, and 310-*d* may differ from one another. The tracking service component 210 may generate updates for the one or more user interaction parameters, for updating the user interaction metrics for one or more of the images 310-*a*, 310-*b*, 310-*c*, and 310-*d*. For example, a user may take a longer time to view image 310-*b* for listing 315-*b*. The user may zoom in on image 310-*a* for listing 315-*a*. The machine learning component 220 may analyze the user interaction metrics to determine whether to maintain a previously-identified unified image as the unified image for the product, or may change to a different unified image. The different unified image may be a seller uploaded image or a different image selected by the machine learning component 220.

In some examples, each user interaction parameter may be ranked differently and analyzed differently based on machine learning analysis performed on the image 310, as well as sales results of the listings 315. For example, in some cases, a user may zoom in on image 310-*a* and may ultimately purchase the product in listing 315-*a*. In this case, the zoom metric may positively improve the score of image 310-*a* in the determination of the unified image. In another case, a user may zoom in on image 310-*c* of the product in listing 315-*c*, but the buyer may ultimately purchase a different product, or may not make a purchase. For example, image 310-*c* may be a low quality image, which may be why the user zoomed in on the image. In this case, the zoom parameter may be a negative score in determining a unified image for the product, and image 310-*c* may be unlikely to be selected as the unified image. The unified image may be presented to a prospective buyer in other configurations.

In another example, listing 315-*a* and listing 315-*c* each may be for a same first product, and listings 315-*b* and 315-*d* may be for a same second product, but the first product and the second product may be different. Thus, images 310-*a* and 310-*c* may be the same, and images 310-*b* and 310-*d* may be the same, but are different from images 310-*a* and 310-*c*. Therefore in this example, less data may be transported across a network (e.g., data for two images rather than four images), which may result in a lower bandwidth utilization transporting the search results page, as less than one image is downloaded per listing 315. In some examples, listing 315-*a* and listing 315-*c* each may be for a same first product, listings 310-*b* may be for a second product that is different than the first product, and listing 310-*d* may be for a third product that is different than the first product and the second product. In this example, images 310-*a* and 310-*c* may be the same, and images 310-*b* and 310-*d* may then be different from each other and images 310-*a* and 310-*c*. In this case, three images may be downloaded, rather than four, which may also result in a lower bandwidth utilization.

FIG. 4 illustrates an example of a webpage 400 that supports network and speed enhancement for distributing unified images via a computer network in accordance with aspects of the present disclosure. Webpage 400 may be an example of a page displaying search results based on a buyer-inputted search query. Webpage 400 may be displayed to a user at a buyer user device (e.g., user device 110) that may be a computer, smartphone, or another client-facing user device. Webpage 400 may be an example of a webpage displayed to a user based on the unified image selection as described herein. Webpage 400 may be displayed in cases with a low network bandwidth, or where limited data is available for downloading images for display to a user.

In some examples, a prospective buyer may input a search query that may be provided to the server system 125. The buyer may be searching for a tablet computer similar to the example provided in FIG. 3. The server system 125 may map the search query to a product associated with the search query. The server system 125 may determine the unified image for a product using the techniques described herein. In the depicted example, the webpage 400 may display search results 405 that includes listings 415-*a*, 415-*b*, 415-*c*, and 415-*d*. Rather than including multiple instances of a same unified image, the search results 405 may include a single image 410 that is the unified image for the product.

For example, server system 125 may determine the unified image 410 for the product (e.g., for a tablet computer product). The server system 125 may also identify that a computer network is experiencing congestion. The server system 125 may respond to a buyer search query with the unified image 410 for the identified listings 415-*a*, 415-*b*, 415-*c*, and 415-*d*, and may not include any of the seller uploaded images, to reduce the amount of data in the search results page 125 communicated via a computer network to the buyer user device. In some cases, a data transmission that includes the search results page 125 may include instructions for the buyer user device to only display a single instance of the unified image associated multiple listings, as shown in FIG. 4, or to display multiple instances of the unified image, where each instance of the unified listing is displayed within each listing, as shown in FIG. 3.

Thus, the techniques described herein may permit a server system that hosts an online application for an online marketplace to present a unified image for a product to enhance the likelihood of a desired outcome, and to enhance network communications. These techniques may be applied when a low network bandwidth connection is identified, a network is congested, or the like, and may be used to increase speed of the search and image downloading. The server system may determine that the unified image may decrease bandwidth, increase speed, and improve user experience by providing a unified image (e.g., a best representative image) for a product, while also downloading one image for multiple listings 415, rather than downloading each image selected by the sellers in generating each product listing 415.

For example, when network speed, network bandwidth, or both, satisfy a congestion threshold indicating that a network is congested, the server system 125 may determine to include the unified image 410 in a search results page. If or when the network speed, or network bandwidth, or both, no longer satisfies the congestion threshold indicating that a network is not currently congested, the server system 125 may elect to display each product listing with the seller-uploaded images in the search results page to, for example, permit updating of a unified image using machine learning techniques. The system may also determine to display the unified images based on other criteria. For example, if multiple product listings are generated by a seller without an image, or if multiple product listings have images ranked lower (based on a threshold) than the determined unified images.

Figure 5:
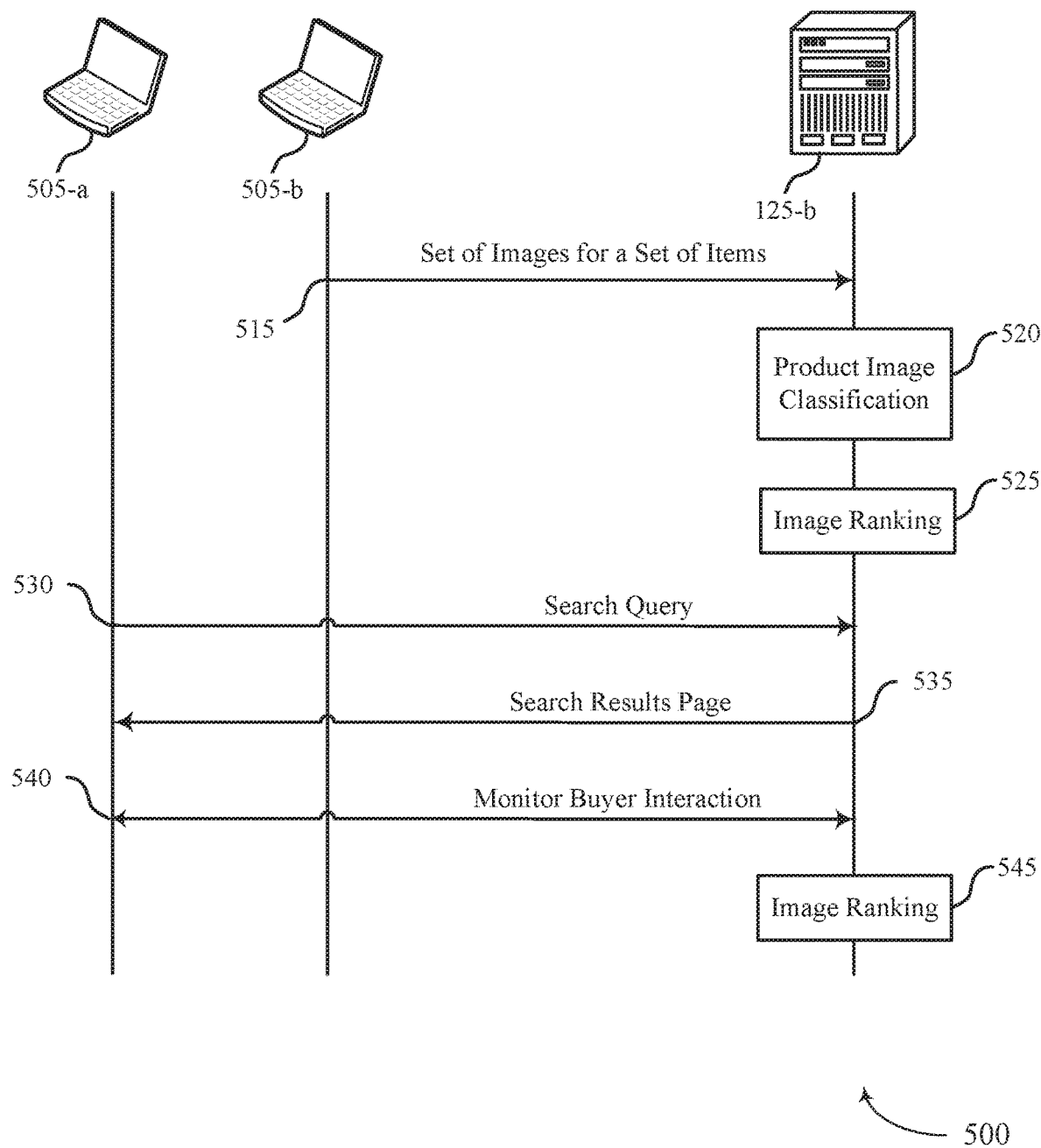
FIG. 5 illustrates an example of a process flow that supports network and speed enhancement for distributing unified images via a computer network in accordance with aspects of the present disclosure.

FIG. 5 illustrates an example of a process flow 500 that supports network and speed enhancement for distributing unified images via a computer network in accordance with aspects of the present disclosure. Process flow 500 may include a server system 125-b, a buyer user device 505-a, and a seller user device 505-b. Server system 125-b may be an example of server system 125 as described with reference to FIG. 1. Buyer user device 505-a and seller user device 505-b may be example of a user device 110 as described with reference to FIG. 1. Seller user device 505-b may be a device that a seller uses to generate a listing for an item for sale via an online marketplace, and may have the option to upload images of the item when creating the listing. Buyer user device 505-a may be a device that a prospective buyer may use to access the online marketplace, such as via a smart-phone app or a website, to search for items listed for sale and to complete purchase transactions.

At 515, server system 125-b may receive a set of images for a set of items that may be associated with a product. For example, at least one seller user device 505-b may interact with the server system 125-b to generate at least one listing for at least one item for sale via an online marketplace. For each listing, the server system 125-b may permit the seller user device 505-b to upload one or more images of an item being listed for sale in a listing. The set of images may be received over time, and the server system 1250-b may map the listings to a product.

In some examples, server system 125-b may receive a listing for the at least one item of the set of items and one or more images of the set of images that may be associated with the listing, where the first image differs from each of the one or more images that may be associated with the listing. In some examples, server system 125-b may receive a listing for the at least one item of the set of items that does not have any images of the set of images associate with the listing.

At 520, in some examples, server system 125-b may perform image classification, such as computer vision analysis, on the set of images based on extracting one or more image characteristics from the set of images. In some examples, server system 125-b may generate, based on the image characteristics, a confidence matching score for each item of the set of items. In some examples, server system 125-b may then map the set of items to the product based on the confidence matching scores.

At 525, server system 125-b may perform image ranking to rank the set of images to identify a first image of the set of images for the product, based on a user interaction metric of each image of the set of images. For example, server system 125-b may monitor, via one or more search results pages, user interaction with the set of images to generate a user interaction metric for each image of the set of images, where ranking the set of images may be based on applying a machine learning model to the user interaction metrics. The monitoring user interaction with the set of images may include monitoring, via one or more search results pages, a user view time for one or more images of the set of images, a user image zoom indicator for one or more images of the set of images, an item sales price for each item in at least a subset of the set of items that sell, or any combination of these, to generate the user interaction metrics.

In some examples, server system 125-b may monitor, via one or more search results pages, user interaction with the first image to generate an updated user interaction metric for the first image. The server system 125-b may then rank, based on the updated user interaction metric, the set of images to identify a second image of the set of images for the product.

At 530, server system 125-b may receive, from buyer user device 505-a, a search query that may be mapped to the product. The server system 125-b may map the search query to the product where the text input into the search query best matches the product. The server system 125-b may receive, from the buyer user device 505-a, or another user device, a second search query that may be mapped to the product.

At 535, server system 125-b may transmit, to buyer user device 505-a, the search results page that includes at least one item of the set of items and the first image based on the user interaction metric of the first image. In some examples, the server system 125-b may transmit, to buyer user device 505-a, the search results page that includes the unified image for a listing associated with a first item and the unified image for a listing associated with a second item of the set of items. The server system 125-b may transmit, to buyer user device 505-a, the search results page that includes the unified image based on a network bandwidth measurement satisfying a bandwidth threshold, indicating, for example, that the network is congested. The server system 125-b may then transmit, to the buyer user device 505-a or a second buyer user device, a second search results page that may be mapped to the product.

At 540, server system 125-b may monitor buyer interaction with the search results page as described herein. The server system 125-b may update one or more user interaction values based on user interaction with the search results page, and may apply machine learning to the one or more updated user interaction values to generate an updated user interaction metric for one or more of the unified image or other seller uploaded images presented in the search results page.

At 545, server system 125-b may perform image ranking to rank the set of images to identify a second unified image (e.g., a second image) of the set of images for the product, based on the update user interaction metric. In some cases, the server system 125-b may keep the same unified image, or may change to a different unified image for the product based on the image ranking.

Figure 6:
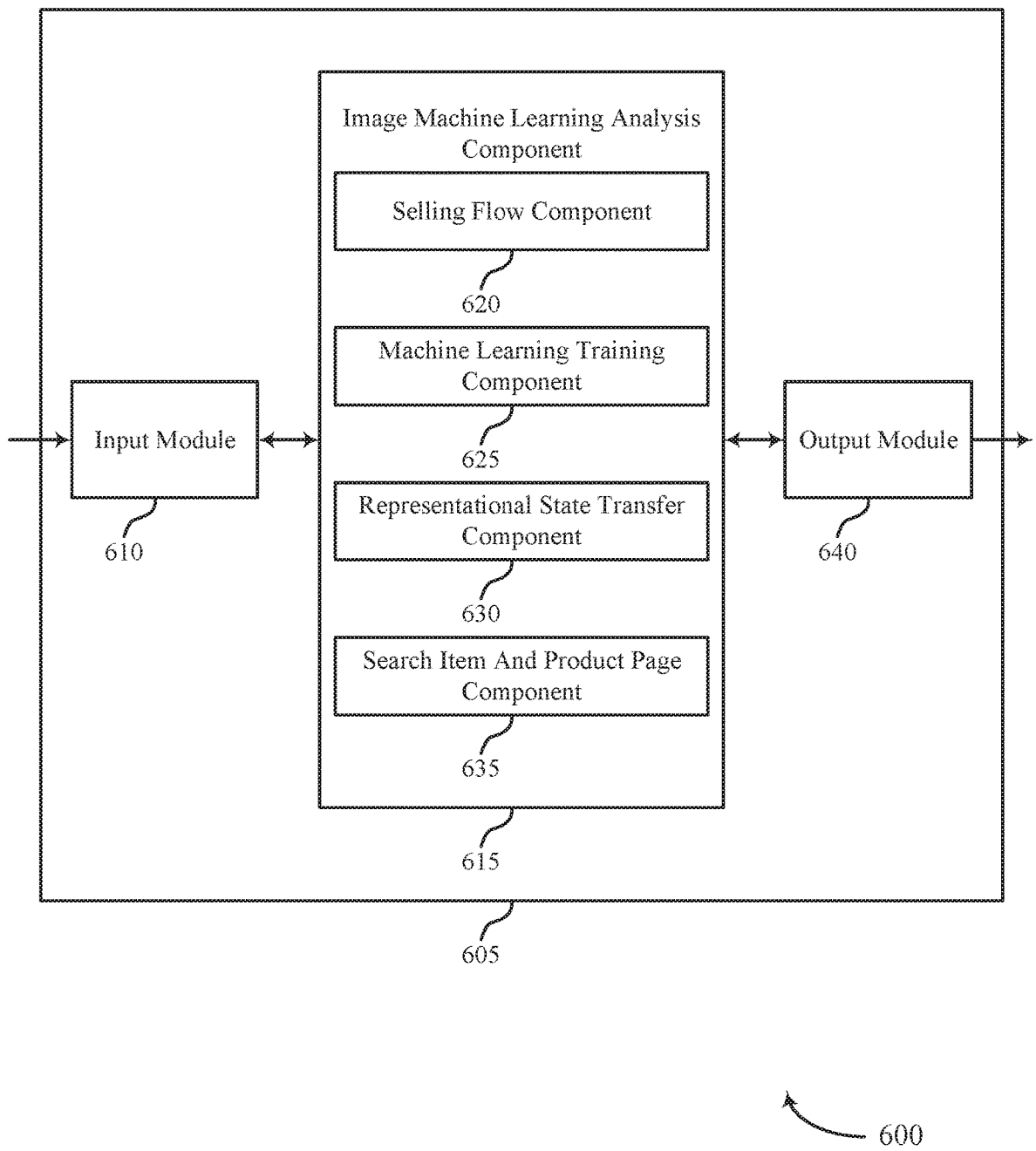
FIG. 6 shows a block diagram of an apparatus that supports network and speed enhancement for distributing unified images via a computer network in accordance with aspects of the present disclosure.

FIG. 6 shows a block diagram 600 of an apparatus 605 that supports network and speed enhancement for distributing unified images via a computer network in accordance with aspects of the present disclosure. The apparatus 605 may include an input module 610, an image machine learning analysis component 615, and an output module 640. The apparatus 605 may also include a processor. Each of these components may be in communication with one another (e.g., via one or more buses). In some cases, the apparatus 605 may be an example of server system 125 and may include, for example, a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the image machine learning analysis component 615 to support network and speed enhancement for distributing unified images via a computer network. In some cases, the input module 610 may be a component of an input/output (I/O) controller 815 as described with reference to FIG. 8.

The image machine learning analysis component 615 may include a selling flow component 620, a machine learning training component 625, a representational state transfer component 630, and a search item and product page component 635. The image machine learning analysis component 615 may be an example of aspects of the image machine learning analysis component 705 or 810 described with reference to FIGS. 7 and 8.

The image machine learning analysis component 615 and/or at least some of its various sub-components may be implemented in hardware, software executed by a processor, firmware, or any combination thereof. If implemented in software executed by a processor, the functions of the image machine learning analysis component 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The image machine learning analysis component 615 and/or at least some of its various sub-components may be physically located at various positions, including being distributed such that portions of functions are implemented at different physical locations by one or more physical devices. In some examples, the image machine learning analysis component 615 and/or at least some of its various sub-components may be a separate and distinct component in accordance with various aspects of the present disclosure. In other examples, the image machine learning analysis component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The selling flow component 620 may receive the set of images for a set of items that are associated with the product. The machine learning training component 625 may perform image ranking to rank the set of images to identify a first image of the set of images for the product, based on a user interaction metric of each image of the set of images. The representational state transfer component 630 may receive, from a user device, a search query that is mapped to the product. The search item and product page component 635 may transmit, to the user device, the search results page that includes at least one item of the set of items and the first image based on the user interaction metric of the first image.

The output module 640 may manage output signals for the apparatus 605. For example, the output module 640 may receive signals from other components of the apparatus 605, such as the image machine learning analysis component 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
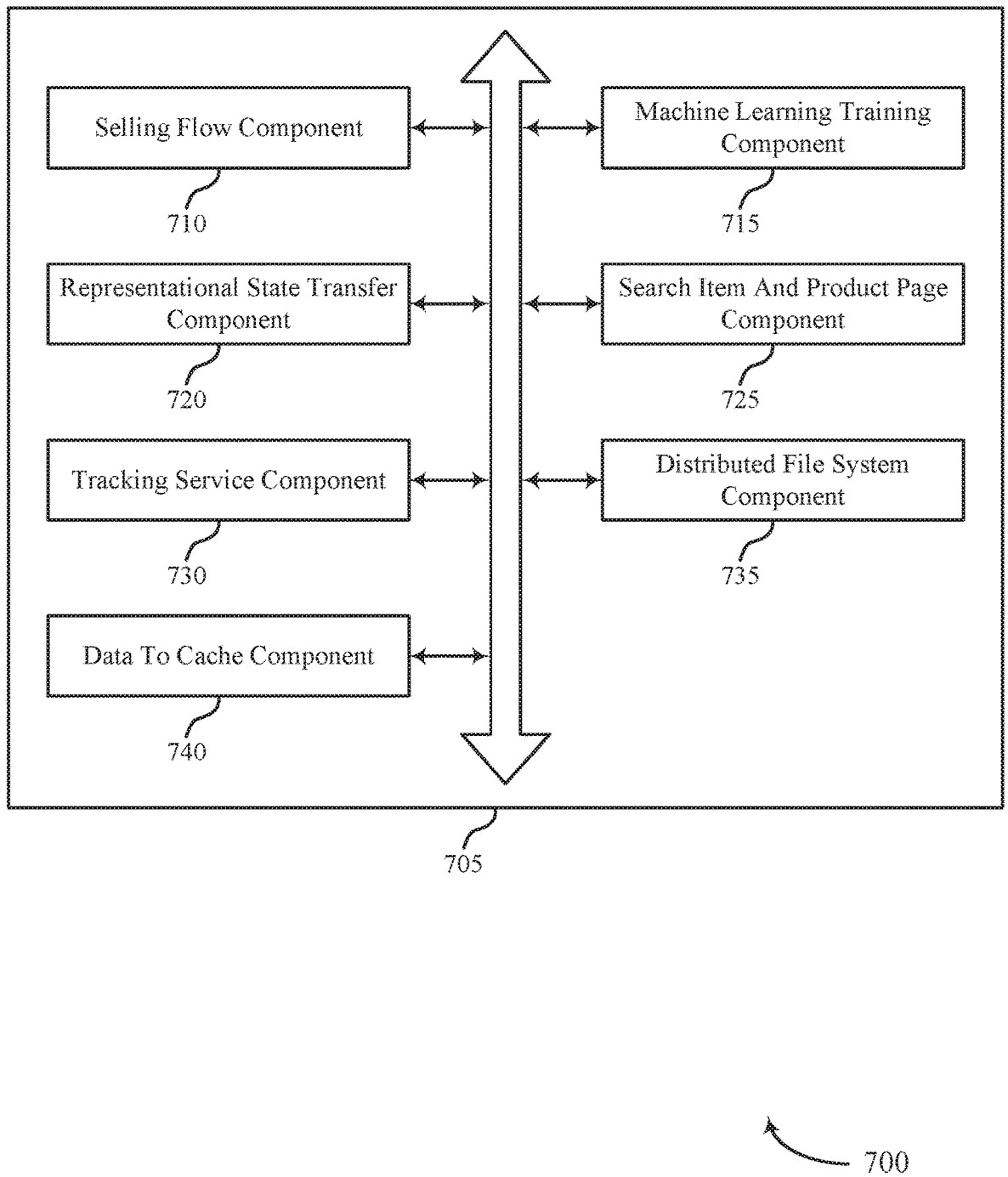
FIG. 7 shows a block diagram of an image machine learning analysis component that supports network and speed enhancement for distributing unified images via a computer network in accordance with aspects of the present disclosure.

FIG. 7 shows a block diagram 700 of an image machine learning analysis component 705 that supports network and speed enhancement for distributing unified images via a computer network in accordance with aspects of the present disclosure. The image machine learning analysis component 705 may be an example of aspects of an image machine learning analysis component 615 or an image machine learning analysis component 810 described herein. The image machine learning analysis component 705 may include a selling flow component 710, a machine learning training component 715, a representational state transfer component 720, a search item and product page component 725, a tracking service component 730, a distributed file system component 735, and a data to cache component 740. Each of these modules may communicate, directly or indirectly, with one another (e.g., via one or more buses).

The selling flow component 710 may receive the set of images for a set of items that are associated with the product. In some examples, the selling flow component 710 may receive a listing for the at least one item of the set of items and one or more images of the set of images that are associated with the listing, where the first image differs from each of the one or more images that are associated with the listing. In some examples, the selling flow component 710 may receive a listing for the at least one item of the set of items that does not have any images of the set of images associated with the listing.

The machine learning training component 715 may perform image ranking to rank the set of images to identify a first image of the set of images for the product, based on a user interaction metric of each image of the set of images. In some examples, the machine learning training component 715 may perform image classification on the set of images based on extracting one or more image characteristics from the set of images. In some examples, the machine learning training component 715 may generate, based on the image characteristics, a confidence matching score for each item of the set of items.

The representational state transfer component 720 may receive, from a user device, a search query that is mapped to the product. In some examples, the representational state transfer component 720 may receive, from the user device or a second user device, a second search query that is mapped to the product.

The search item and product page component 725 may transmit, to the user device, the search results page that includes at least one item of the set of items and the first image based on the user interaction metric of the first image. In some examples, the search item and product page component 725 may transmit, to the user device, the search results page that includes the first image for a listing associated with a first item and the first image for a listing associated with a second item of the set of items. In some examples, the search item and product page component 725 may transmit, to the user device, the search results page that includes the first image based on a network bandwidth measurement satisfying a bandwidth threshold. In some examples, the search item and product page component 725 may transmit, to the user device or the second user device, a second search results page that includes the second image that is the same as the first image or differs from the first image.

The tracking service component 730 and the machine learning training component 715 may coordinate to may monitor, via one or more search results pages, user interaction with the set of images and to generate a user interaction metric for each image of the set of images, where ranking the set of images is based on applying a machine learning model to the user interaction metrics. In some examples, the tracking service component 730 may monitor, via one or more search results pages, a user view time for one or more images of the set of images, a user image zoom indicator for one or more images of the set of images, an item sales price for each item in at least a subset of the set of items that sell, or any combination thereof, to generate the user interaction metrics. In some examples, the tracking service component 730 may monitor, via one or more search results pages, user interaction with the first image to generate an updated user interaction metric for the first image.

The machine learning training component 715 may rank, based on the updated user interaction metric, the set of images to identify a second image of the set of images for the product. The machine learning training component 715 may also map the set of items to the product based on the confidence matching scores.

The distributed file system component 735 may store listings and seller uploaded images. The data to cache component 740 may cache a unified image for each product.

Figure 8:
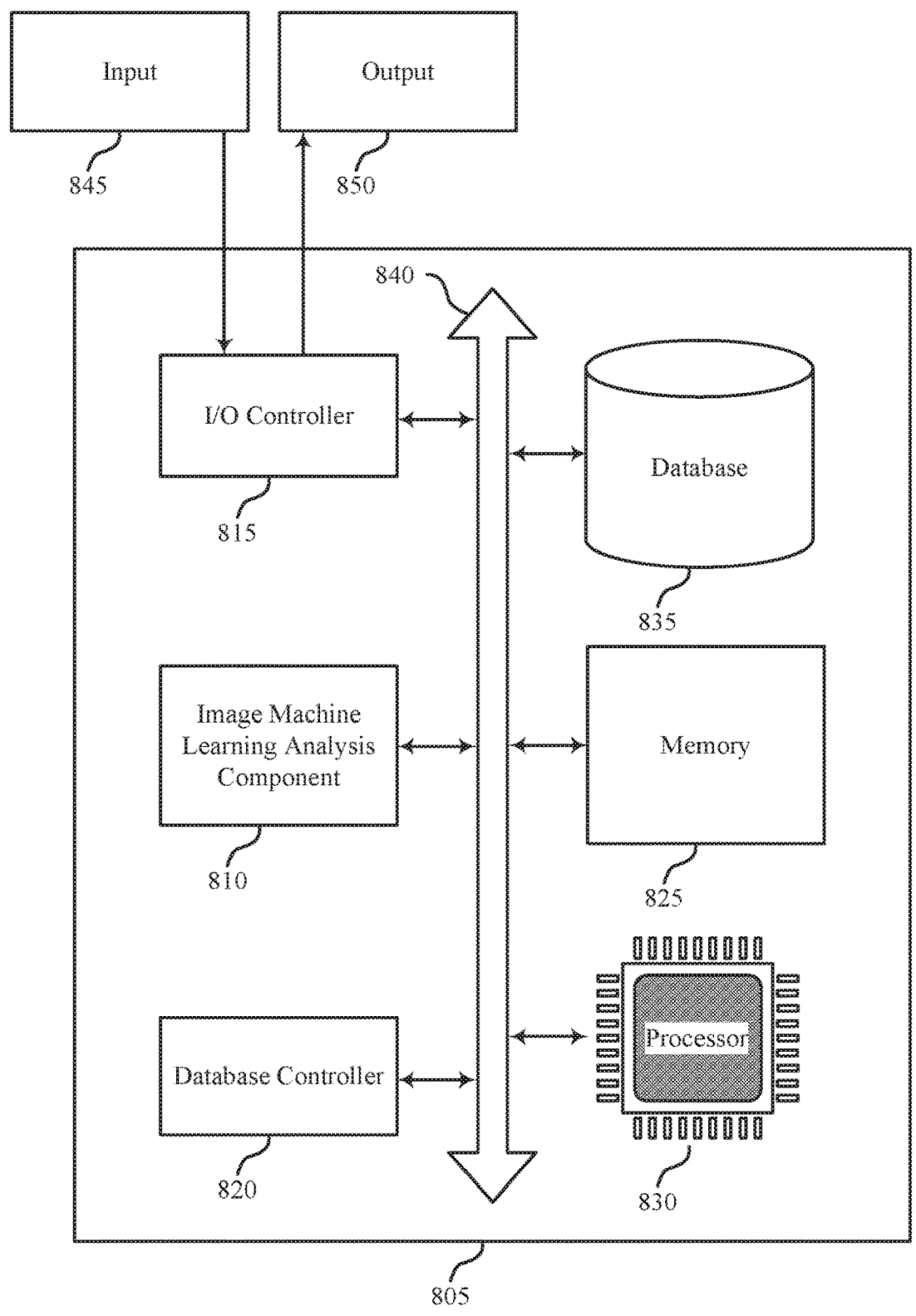
FIG. 8 shows a diagram of a system including a device that supports network and speed enhancement for distributing unified images via a computer network in accordance with aspects of the present disclosure.

FIG. 8 shows a diagram of a system 800 including a device 805 that supports network and speed enhancement for distributing unified images via a computer network in accordance with aspects of the present disclosure. The device 805 may be an example of or include the components of a server system or an apparatus 605 as described herein. The device 805 may include components for bi-directional data communications including components for transmitting and receiving communications, including an image machine learning analysis component 810, an I/O controller 815, a database controller 820, memory 825, a processor 830, a database 835, and an image machine learning analysis component 855. These components may be in electronic communication via one or more buses (e.g., bus 840).

The image machine learning analysis component 810 may be an example of an image machine learning analysis component 615 or 705 as described herein. For example, the image machine learning analysis component 810 may perform any of the methods or processes described above with reference to FIGS. 6 and 7. In some cases, the image machine learning analysis component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting network and speed enhancement for distributing unified images via a computer network).

The image machine learning analysis component 835 may interact with each of the I/O controller 815, the image machine learning analysis component 810, the database controller 820, the database 835, the memory 825, and the processor 830 via bus 840 to operate a computer-implemented process for determining which image of a set of images to present in a search results page for a product. The process may include receiving the set of images for a set of items that are associated with the product. These images may be received via the I/O controller 815 based on an input 845. The process may also include performing image ranking to rank the set of images to identify a first image of the set of images for the product, based at least in part on a user interaction metric of each image of the set of images. The process may also include receiving, from a user device, via input 845 and the I/O controller 815, a search query that is mapped to the product. The process may also include transmitting, to the user device, via output 850 and the I/O controller 815, the search results page that includes at least one item of the set of items and the first image based at least in part on the user interaction metric of the first image.

Figure 9:
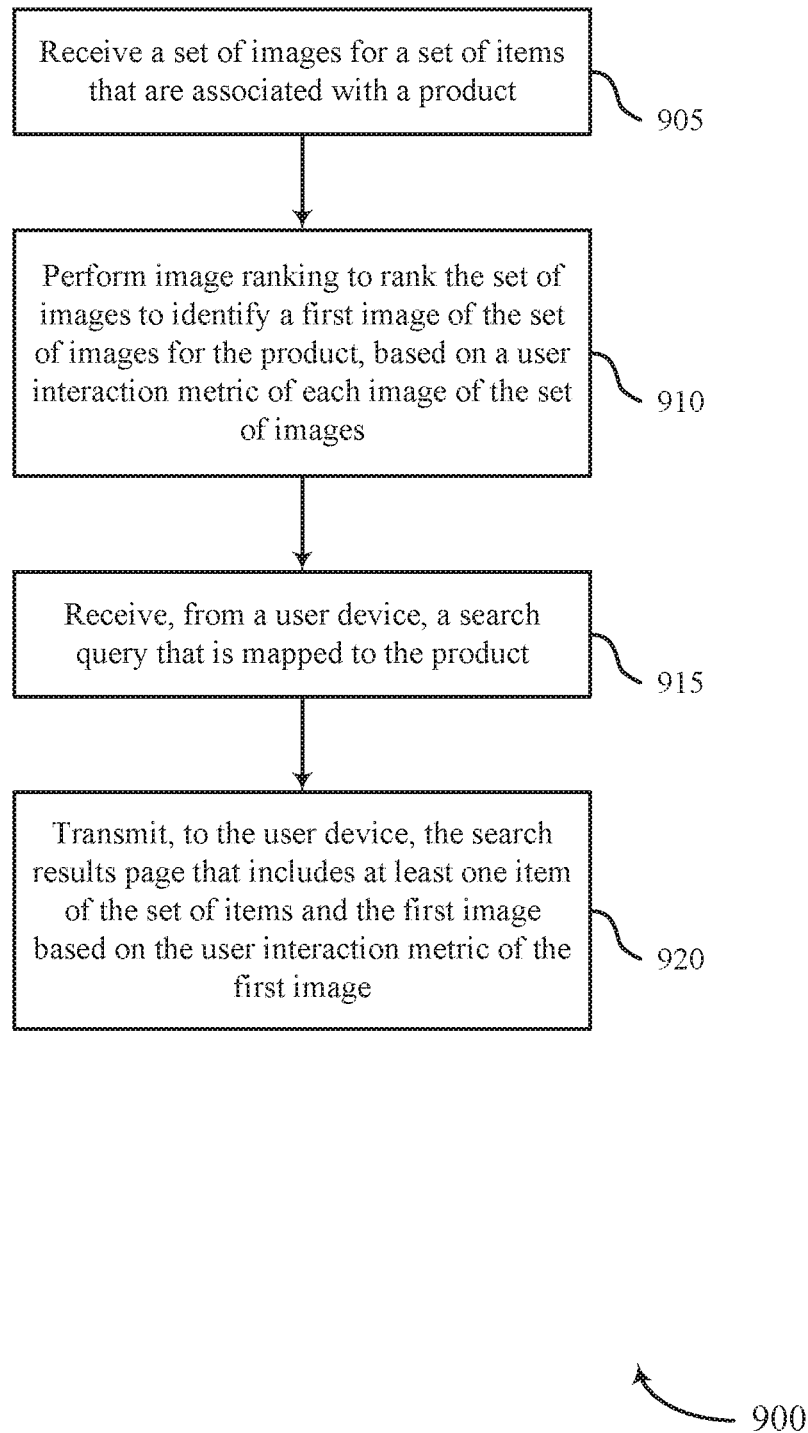
FIGS. 9 through 11 show flowcharts illustrating methods that support network and speed enhancement for distributing unified images via a computer network in accordance with aspects of the present disclosure.

FIG. 9 shows a flowchart illustrating a method 900 that supports network and speed enhancement for distributing unified images via a computer network in accordance with aspects of the present disclosure. The operations of method 900 may be implemented by a server system or its components as described herein. For example, the operations of method 900 may be performed by an Image Machine Learning Analysis Component as described with reference to FIGS. 6 through 8. In some examples, a server system may execute a set of instructions to control the functional elements of the server system to perform the functions described below. Additionally or alternatively, a server system may perform aspects of the functions described below using special-purpose hardware.

At 905, the server system may receive the set of images for a set of items that are associated with the product. The operations of 905 may be performed according to the methods described herein. In some examples, aspects of the operations of 905 may be performed by a selling flow component as described with reference to FIGS. 6 through 8.

At 910, the server system may perform image ranking to rank the set of images to identify a first image of the set of images for the product, based on a user interaction metric of each image of the set of images. The operations of 910 may be performed according to the methods described herein. In some examples, aspects of the operations of 910 may be performed by a machine learning training component as described with reference to FIGS. 6 through 8.

At 915, the server system may receive, from a user device, a search query that is mapped to the product. The operations of 915 may be performed according to the methods described herein. In some examples, aspects of the operations of 915 may be performed by a search item and product page component as described with reference to FIGS. 6 through 8.

At 920, the server system may transmit, to the user device, the search results page that includes at least one item of the set of items and the first image based on the user interaction metric of the first image. The operations of 920 may be performed according to the methods described herein. In some examples, aspects of the operations of 920 may be performed by a search item and product page component as described with reference to FIGS. 6 through 8.

Figure 10:
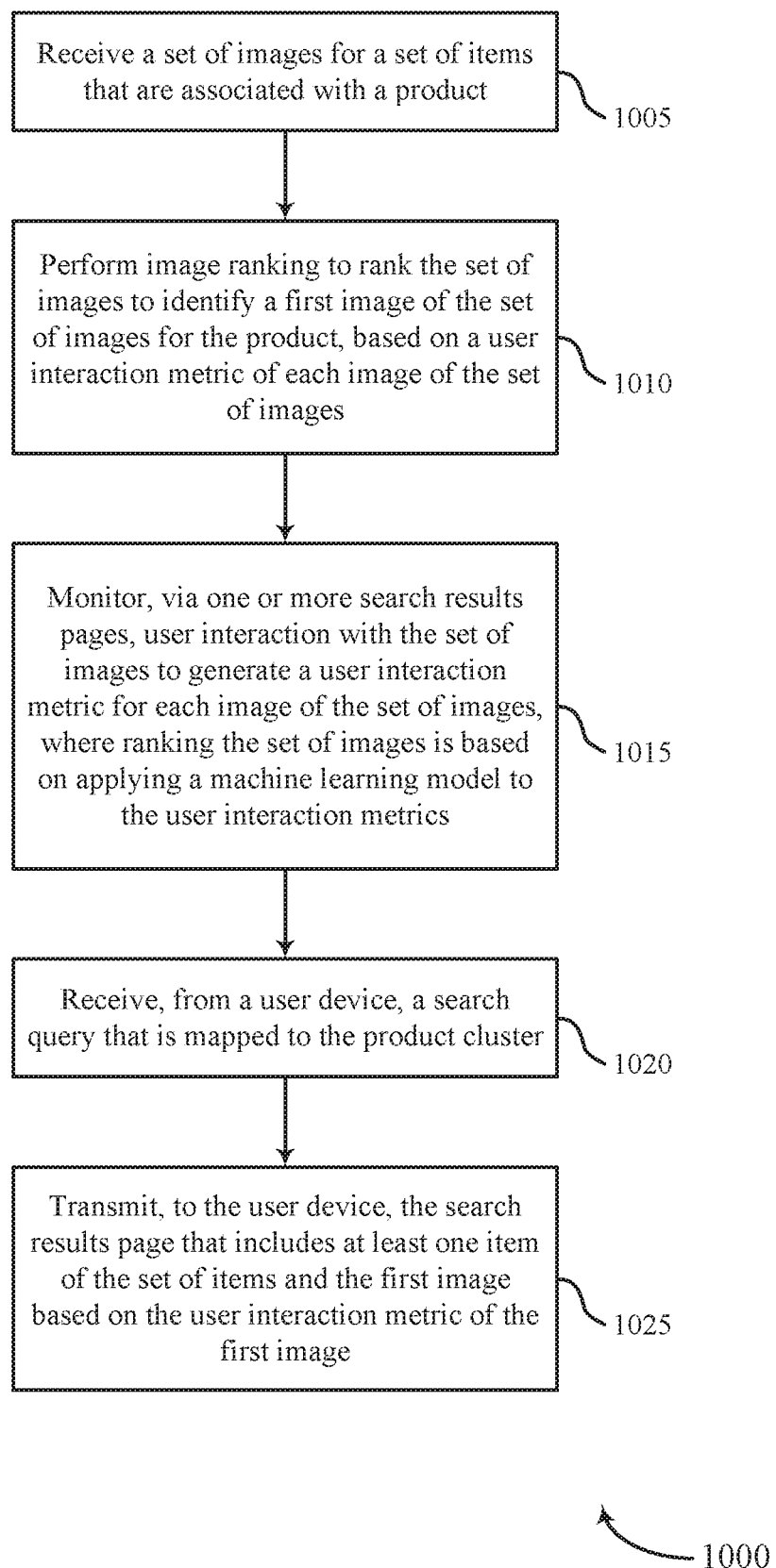

FIG. 10 shows a flowchart illustrating a method 1000 that supports network and speed enhancement for distributing unified images via a computer network in accordance with aspects of the present disclosure. The operations of method 1000 may be implemented by a server system or its components as described herein. For example, the operations of method 1000 may be performed by an Image Machine Learning Analysis Component as described with reference to FIGS. 6 through 8. In some examples, a server system may execute a set of instructions to control the functional elements of the server system to perform the functions described below. Additionally or alternatively, a server system may perform aspects of the functions described below using special-purpose hardware.

At 1005, the server system may receive the set of images for a set of items that are associated with the product. The operations of 1005 may be performed according to the methods described herein. In some examples, aspects of the operations of 1005 may be performed by a selling flow component as described with reference to FIGS. 6 through 8.

At 1010, the server system may perform image ranking to rank the set of images to identify a first image of the set of images for the product, based on a user interaction metric of each image of the set of images. The operations of 1010 may be performed according to the methods described herein. In some examples, aspects of the operations of 1010 may be performed by a machine learning training component as described with reference to FIGS. 6 through 8.

At 1015, the server system may monitor, via one or more search results pages, user interaction with the set of images to generate a user interaction metric for each image of the set of images, where ranking the set of images is based on applying a machine learning model to the user interaction metrics. The operations of 1015 may be performed according to the methods described herein. In some examples, aspects of the operations of 1015 may be performed by a tracking service component and/or a machine learning training component as described with reference to FIGS. 6 through 8.

At 1020, the server system may receive, from a user device, a search query that is mapped to the product. The operations of 1020 may be performed according to the methods described herein. In some examples, aspects of the operations of 1020 may be performed by a representational state transfer component as described with reference to FIGS. 6 through 8.

At 1025, the server system may transmit, to the user device, the search results page that includes at least one item of the set of items and the first image based on the user interaction metric of the first image. The operations of 1025 may be performed according to the methods described herein. In some examples, aspects of the operations of 1025 may be performed by a search item and product page component as described with reference to FIGS. 6 through 8.

Figure 11:
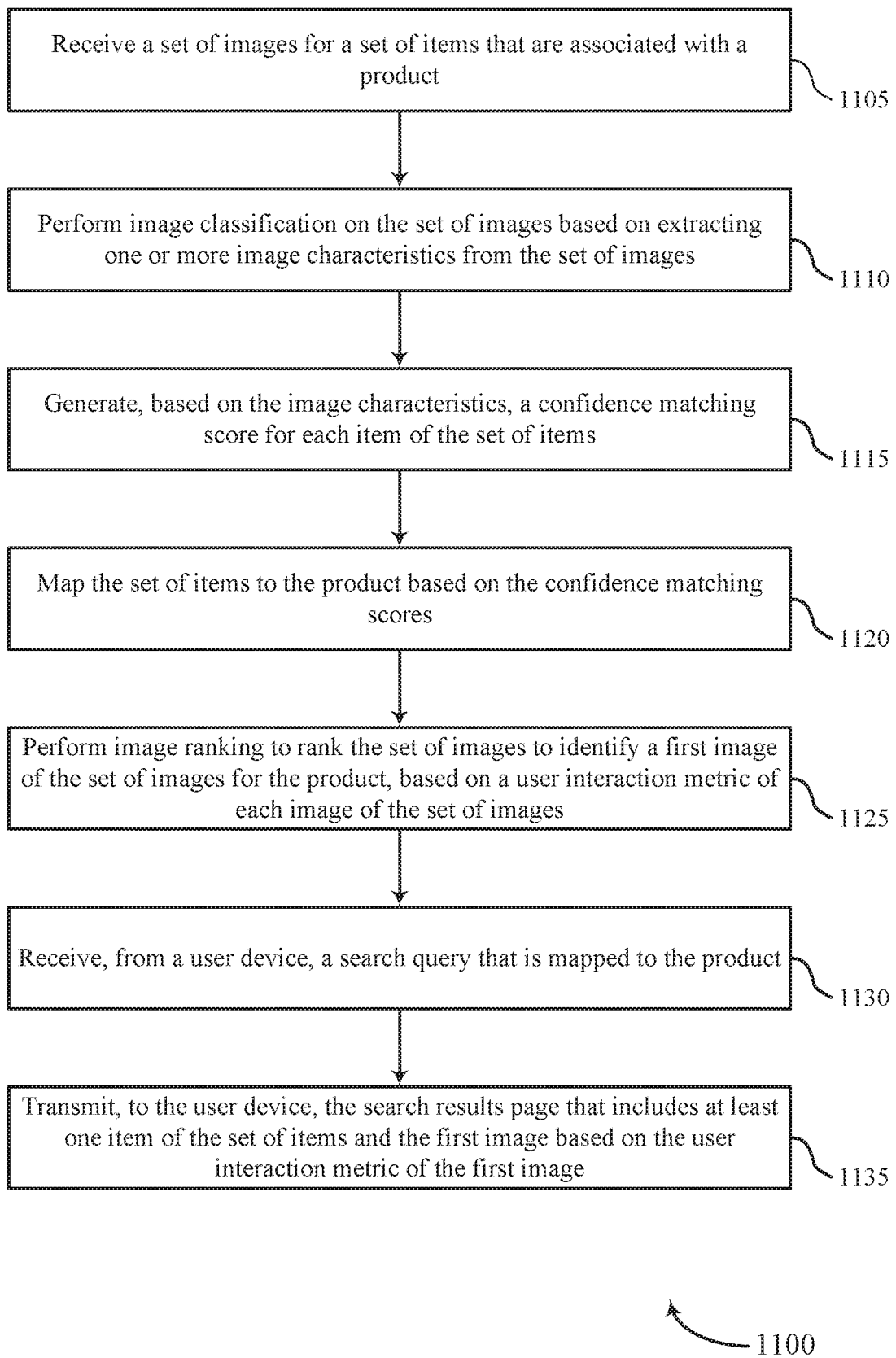

FIG. 11 shows a flowchart illustrating a method 1100 that supports network and speed enhancement for distributing unified images via a computer network in accordance with aspects of the present disclosure. The operations of method 1100 may be implemented by a server system or its components as described herein. For example, the operations of method 1100 may be performed by an Image Machine Learning Analysis Component as described with reference to FIGS. 6 through 8. In some examples, a server system may execute a set of instructions to control the functional elements of the server system to perform the functions described below. Additionally or alternatively, a server system may perform aspects of the functions described below using special-purpose hardware.

At 1105, the server system may receive the set of images for a set of items that are associated with the product. The operations of 1105 may be performed according to the methods described herein. In some examples, aspects of the operations of 1105 may be performed by a selling flow component as described with reference to FIGS. 6 through 8.

At 1110, the server system may perform image classification on the set of images based on extracting one or more image characteristics from the set of images. The operations of 1110 may be performed according to the methods described herein. In some examples, aspects of the operations of 1110 may be performed by a machine learning training component as described with reference to FIGS. 6 through 8.

At 1115, the server system may generate, based on the image characteristics, a confidence matching score for each item of the set of items. The operations of 1115 may be performed according to the methods described herein. In some examples, aspects of the operations of 1115 may be performed by a machine learning training component as described with reference to FIGS. 6 through 8.

At 1120, the server system may map the set of items to the product based on the confidence matching scores. The operations of 1120 may be performed according to the methods described herein. In some examples, aspects of the operations of 1120 may be performed by a tracking service component as described with reference to FIGS. 6 through 8.

At 1125, the server system may perform image ranking to rank the set of images to identify a first image of the set of images for the product, based on a user interaction metric of each image of the set of images. The operations of 1125 may be performed according to the methods described herein. In some examples, aspects of the operations of 1125 may be performed by a machine learning training component as described with reference to FIGS. 6 through 8.

At 1130, the server system may receive, from a user device, a search query that is mapped to the product. The operations of 1130 may be performed according to the methods described herein. In some examples, aspects of the operations of 1130 may be performed by a search item and product page component as described with reference to FIGS. 6 through 8.

At 1135, the server system may transmit, to the user device, the search results page that includes at least one item of the set of items and the first image based on the user interaction metric of the first image. The operations of 1135 may be performed according to the methods described herein. In some examples, aspects of the operations of 1135 may be performed by a search item and product page component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for image selection based at least in part on bandwidth utilization of a network, the method comprising:
   receiving a plurality of images for a plurality of listings and, for each image of the plurality of images, an indication of a product associated with the image, the plurality of listings generated by an online marketplace;
   for each image of the plurality of images:
     mapping, based at least in part on the indication of the product associated with the image, the image to the product;
     generating, based at least in part on extracting one or more image characteristics from the image, a confidence matching score indicating a likelihood that the mapping of the image to the product is accurate; and
     determining, based at least in part on whether the confidence matching score satisfies a confidence threshold, whether to update the mapping of the image to a different product;
   identifying, from the plurality of images, a set of images mapped to a first product and associated with a confidence matching score that satisfies the confidence threshold;
   performing, by one or more processors, image ranking to rank the set of images to identify a single image for the first product, based at least in part on a user interaction metric for each image of the set of images;
   monitoring the bandwidth utilization of the network;
   receiving, from a user device, via the network, and during the monitoring, a search query that is mapped to the first product;
   in response to receiving the search query and based at least in part on the monitoring, determining a current network bandwidth measurement associated with the network;
   determining, based at least in part on whether the current network bandwidth measurement satisfies a congestion threshold, whether to transmit the single image for the first product or the set of images mapped to the first product;
   determining that the current network bandwidth measurement satisfies the congestion threshold; and
   transmitting, to the user device and based at least in part on determining that the current network bandwidth measurement satisfies the congestion threshold, a search results page that includes:
     two or more listings, of the plurality of listings, that are associated with the first product, and
     the single image for the first product.

2. The method of claim 1, further comprising:
   monitoring, via one or more search results pages, user interaction with the set of images to generate a user interaction metric for each image of the set of images, wherein ranking the set of images is based at least in part on applying a machine learning model to user interaction metrics generated for the set of images.

3. The method of claim 1, wherein performing image ranking to rank the set of images to identify the single image for the first product comprises:
   monitoring sale prices associated with the set of images to generate the user interaction metrics; and
   selecting an image of the set of images as the single image based at least in part on a value of the user interaction metric for the single image corresponding to a higher sales price for the first product, relative to values of one or more user interaction metrics for at least one other image of the set of images.

4. The method of claim 1, further comprising:
   monitoring, via one or more search results pages, user interaction with the single image to generate an updated user interaction metric for the single image;
   ranking, based at least in part on the updated user interaction metric, the set of images to identify a second image;
   receiving, from the user device or a second user device, a second search query that is mapped to the first product; and
   transmitting, to the user device or the second user device, a second search results page that includes the second image, wherein the second image is the same as the single image or differs from the single image.

5. The method of claim 1, wherein receiving the plurality of images for the plurality of listings comprises:
   receiving, for a listing of the plurality of listings that is associated with the first product, one or more images of the plurality of images that are associated with the listing, wherein the single image differs from each of the one or more images that are associated with the listing.

6. The method of claim 1, further comprising:
   receiving a listing, of the plurality of listings, that does not have any images of the plurality of images associated with the listing.

7. The method of claim 1, wherein the current network bandwidth measurement is based at least in part on a congestion level of the network, a cost to transmit an amount of data via the network, or a network connection type of the network.

8. The computer-implemented method of claim 1, further comprising:
   receiving, via the network, a second search query that is mapped to the first product;
   determining that the current network bandwidth measurement no longer satisfies the congestion threshold; and
   based at least in part on the current network bandwidth measurement no longer satisfying the congestion threshold, transmitting the set of images in a search results page including the two or more listings associated with the first product.

9. A system for image selection based at least in part on bandwidth utilization of a network, comprising:
   a memory device for storing instructions; and
   at least one processor which, when executing the instructions, causes the system to perform operations comprising:

receiving a plurality of images for a plurality of listings and, for each image of the plurality of images, an indication of a product associated with the image, the plurality of listings generated by an online marketplace;

for each image of the plurality of images:
  mapping, based at least in part on the indication of the product associated with the image, the image to the product;
  generating, based at least in part on extracting one or more image characteristics from the image, a confidence matching score indicating a likelihood that the mapping of the image to the product is accurate; and
  determining, based at least in part on whether the confidence matching score satisfies a confidence threshold, whether to update the mapping of the image to a different product;

identifying, from the plurality of images, a set of images mapped to a first product and associated with a confidence matching score that satisfies the confidence threshold;

performing image ranking to rank the set of images to identify a single image for the first product, based at least in part on a user interaction metric of each image of set of images;

monitoring the bandwidth utilization of the network;

receiving, from a user device, via the network, and during the monitoring, a search query that is mapped to the first product;

in response to receiving the search query and based at least in part on the monitoring, determining a current network bandwidth measurement associated with the network;

determining, based at least in part on whether the current network bandwidth measurement satisfies a congestion threshold, whether to transmit the single image for the first product or the set of images mapped to the first product;

determining that the current network bandwidth measurement satisfies the congestion threshold; and transmitting, to the user device and based at least in part on determining that the current network bandwidth measurement satisfies the congestion threshold, a search results page that includes:
  two or more listings, of the plurality of listings, that are associated with the first product, and
  the single image for the first product.

10. The system of claim 9, wherein the at least one processor, when executing the instructions, further causes the system to perform operations comprising:
  monitoring, via one or more search results pages, user interaction with the set of images to generate a user interaction metric for each image of the set of images, wherein ranking the set of images is based at least in part on applying a machine learning model to user interaction metrics generated for the set of images.

11. The system of claim 9, wherein the instructions for performing image ranking to rank the set of images to identify the single image for the first product, when executed, further cause the system to perform operations comprising:
  monitoring sale prices associated with the set of images to generate user interaction metrics; and
  selecting an image of the set of images as the single image based at least in part on a value of the user interaction metric for the single image corresponding to a higher sales price for the first product relative to values of one or more user interaction metrics for at least one other image of the set of images.

12. The system of claim 9, wherein the at least one processor, when executing the instructions, further causes the system to perform operations comprising:
  monitoring, via one or more search results pages, user interaction with the single image to generate an updated user interaction metric for the single image;
  ranking, based at least in part on the updated user interaction metric, the set of images to identify a second image;
  receiving, from the user device or a second user device, a second search query that is mapped to the first product; and
  transmitting, to the user device or the second user device, a second search results page that includes the second image, wherein the second image is the same as the single image or differs from the single image.

13. The system of claim 9, wherein the at least one processor, when executing the instructions, further causes the system to perform operations comprising:
  receiving a listing, of the plurality of listings, that does not have any images of the plurality of images associated with the listing.

14. The system of claim 9, wherein the instructions for receiving the plurality of images for the plurality of listings, when executed, further cause the system to perform operations comprising:
  receiving, for a listing of the plurality of listings that is associated with the first product, one or more images of the plurality of images that are associated with the listing, wherein the single image differs from each of the one or more images that are associated with the listing.

15. The system of claim 9, wherein the current network bandwidth measurement is based at least in part on a congestion level of the network, a cost to transmit an amount of data via the network, or a network connection type of the network.

16. A non-transitory computer-readable medium comprising instructions which, when read by a machine, cause the machine to perform operations for image selection based at least in part on bandwidth utilization of a network, the operations comprising:
  receiving a plurality of images for a plurality of listings and, for each image of the plurality of images, an indication of a product-associated with the image, the plurality of listings generated by an online marketplace;
  for each image of the plurality of images:
    mapping, based at least in part on the indication of the product associated with the image, the image to the product;
    generating, based at least in part on extracting one or more image characteristics from the image, a confidence matching score indicating a likelihood that the mapping of the image to the product is accurate; and
    determining, based at least in part on whether the confidence matching score satisfies a confidence threshold, whether to update the mapping of the image to a different product;
  identifying, from the plurality of images, a set of images mapped to a first product and associated with a confidence matching score that satisfies the confidence threshold;

performing image ranking to rank the set of images to identify a single image for the first product, based at least in part on a user interaction metric of each image of the set of images;

monitoring the bandwidth utilization of the network;

receiving, from a user device, via the network, and during the monitoring, a search query that is mapped to the first product;

in response to receiving the search query and based at least in part on the monitoring, determining a current network bandwidth measurement associated with the network;

determining, based at least in part on whether the current network bandwidth measurement satisfies a congestion threshold, whether to transmit the single image for the first product or the set of images mapped to the first product;

determining that the current network bandwidth measurement satisfies the congestion threshold; and transmitting, to the user device and based at least in part on determining that the current network bandwidth measurement satisfies the congestion threshold, a search results page that includes:

two or more listings, of the plurality of listings, that are associated with the first product, and the single image for the first product.

17. The non-transitory computer-readable medium of claim 16, wherein the current network bandwidth measurement is based at least in part on a congestion level of the network, a cost to transmit an amount of data via the network, or a network connection type of the network.

\* \* \* \* \*